April 22, 1930.  J. F. O'CONNOR  1,755,408
BRAKE
Filed Sept. 12, 1924

Witnesses
Wm. Geiger

Inventor
John F. O'Connor
By George I. Haight
His Atty.

Patented Apr. 22, 1930

1,755,408

UNITED STATES PATENT OFFICE

JOHN F. O'CONNOR, OF CHICAGO, ILLINOIS, ASSIGNOR, BY MESNE ASSIGNMENTS, TO W. H. MINER, INC., A CORPORATION OF DELAWARE

BRAKE

Application filed September 12, 1924. Serial No. 737,257.

This invention relates to improvements in brakes.

An object of my invention is to provide a hand brake for railway and other cars, having means for quickly taking up the slack in the brake chain, and automatically increasing the leverage ratio pull on the brake chain, during the final application of the braking pressure.

A more particular object of my invention is to provide a hand brake of this character, which includes a plurality of transmitting means movable relatively to each other to effect different transmitting ratios dependent upon their position, together with driving and shifting mechanism, adapted to automatically bodily shift certain of the transmitting means to change the driving ratio upon encountering a predetermined resistance.

Another object of the invention is to provide a combined driving and shifting mechanism, including cam means associated with said transmitting means, which operates initially to drive the same, then automatically shifts the transmitting means to change the ration, and finally affording a positive driving connection with the related transmitting means in its shifted position.

Other objects and advantages of my invention will more clearly appear from the description and claims hereinafter following.

Figure 1:
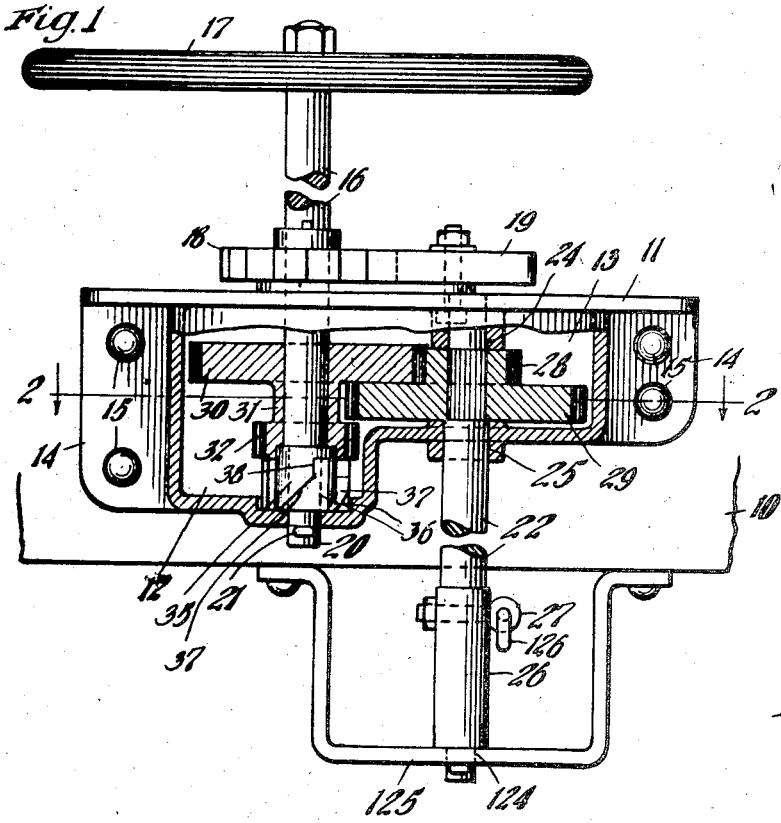
Figure 2:
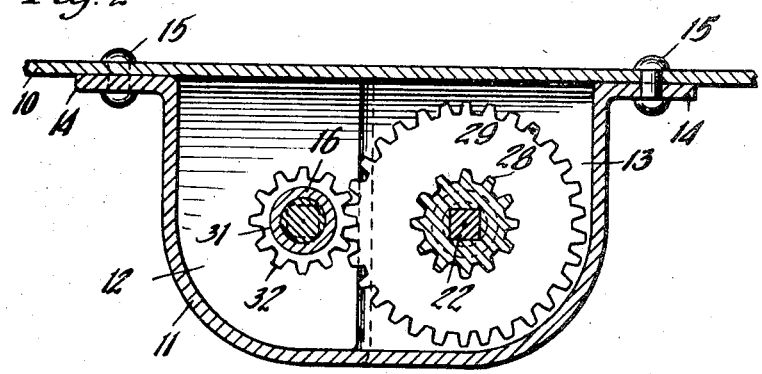
Figure 3:
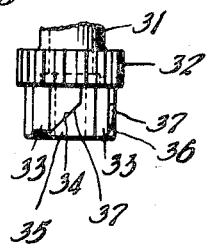
Figure 4:
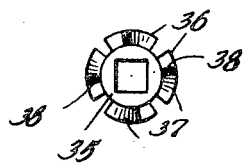

In the drawing forming a part of this specification, Figure 1 is a vertical sectional view, partly in elevation, showing the brake mechanism contemplated by my invention. Figure 2 is a sectional view of the invention on the line 2—2 of Figure 1. Figure 3 is a detail view of the shifting mechanism used in connection with my invention. And Figure 4 is a detail view of the driving element of such shifting mechanism.

Referring to the drawings, 10 indicates a portion of a railway car to which the brake is secured. The brake includes an elongated housing 11, the upper wall of which serves as a brake step, said housing having a relatively large compartment 12, and a smaller compartment 13, there being flanges 14 on such housing, which are secured to the portion 10 of the car, by means of rivets 15, or other suitable securing members.

Rotatably journaled in the housing 11, and extending through the compartment 12 thereof, is a brake staff 16, to the upper end of which is secured an operating wheel 17. A ratchet mechanism is provided for co-operation with the staff 16, exteriorly of the housing, such ratchet mechanism, including a ratchet wheel 18 keyed to the staff 16, and a foot operated pawl 19 pivotally mounted on a bolt on the housing 11, and arranged to engage the ratchet 18, such ratchet mechanism permitting rotation of the staff 16 in a clockwise direction, but preventing retrograde movement thereof, until released by the brakeman. The lower end 20 of the staff 16 extends through the bottom wall of the housing 11 as shown, there being a cotter pin 21 extending through the extremity thereof, exteriorly of the housing, to retain the staff in operative position.

Rotatably journaled in the housing 11, adjacent to staff 16, is a counter shaft 22, the upper portion 23 of such shaft being disposed in the bearings 24 and 25, provided in the top and bottom walls of the housing, and the lower portion of the shaft 23 being journaled as shown at 124 in the stirrup 125. A tightening element or drum 26 forms part of the lower portion of the shaft 22, such drum being adapted to have a chain 126 secured to the fastening member 27, thereon, such chain extending to the brake rigging in the ordinary manner.

Fixedly mounted on the counter shaft 22, between the bearings 24 and 25, in the compartment 13, are transmitting elements in the form of gears 28 and 29, such gears preferably being formed integrally, the gear 28 being of relatively small size, and the gear 29 of relatively large size. Loosely disposed upon the staff 16 is a relatively large transmitting member or gear 30 arranged to normally mesh with the small transmitting member or gear 28, and secured to the gear 30, preferably by means of an integral hub 31, is a relatively smaller gear 32, the gear 32 being spaced by the connecting member 31 from the gear 30 a distance preferably a little greater than the width of the gear 29, as shown.

The gear 32 is formed with a plurality of spaced extensions on its lower face providing clutch members 33, the outer ends of which preferably have inclined portions 34, which are of relatively short extent. Fixed to lower end of the staff 16 is a driving member 35 provided with a plurality of driving elements or lugs 36 having a co-operative relation with the clutch members 33, the lugs being normally adapted for disposition in the spaces provided between such clutch members. Each of the driving lugs 36 has a cam face 37, and a straight face 38, the arrangement being such that, upon rotation of the driving members 35, the inclined faces 37 of the driving lugs engage the inclined portions 34 of the clutch members 33, so as to cam the clutch members 33 upwardly the required distance, and with them the gears 30 and 32, after which the straight faces 38 of the driving lugs of the driving member engage the straight sides of the clutch members and thereby afford a positive driving connection after the gears are shifted.

In operation, upon rotation of the staff 16, in a clock-wise direction, rotation is imparted to the driving member 35, the driving lugs 36 thereof bearing against the adjacent faces of the clutch members 33, causing rotation of the large gear 30, which in turn causes rotation of the small gear 28, on the counter shaft 22, and the drum 26. This operation results in a rapid preliminary winding of the drum 26, to take up the slack in the chain leading to the brake rigging. Upon a predetermined resistance being encountered, that is, when the slack has been taken up, and it requires more power to operate the brake, upon continued rotation of the staff 16 and the driving member 35, the driving lugs 36, due to their inclined faces 37, will cam the clutch members 33 upwardly, bodily shifting the gear 30 out of mesh with the small gear 28 on the counter shaft 22 and the small gear 32 into mesh with the large gear 29 on such countershaft, the cam faces 37 being of sufficient extent to cause a complete disengagement of the gear 30 and engagement of the gear 32. The clutch members 33, during their travel along the inclined faces 37 of the driving lugs, eventually come into engagement with the straight faces 38 of the lugs 36. This engagement terminates the lifting movement of the gears and provides a positive driving connection between the driving member 35, and the small gear 32 through the clutch members, which movement is transmitted to the large gear 29, thereby many times increasing the power ratio of the drive. By this arrangement, the driving ratio of the members is changed from high speed during the preliminary action of the brake, to a much larger power ratio but slower speed when the slack has been taken up.

An important feature of my invention resides in providing the transmitting elements in sets, one of which includes the adjacent gears 28 and 29, and the other the spaced gears 30 and 32, which sets are relatively movable to effect different ratios, together with the driving mechanism, including the cam faces, which initially drives the sets of gears when in their normal position, then automatically shifts the gears 28 and 29 upon encountering a predetermined resistance, and thereafter affords a positive driving connection in the shifted position of the gears, the elements resuming their normal position through the influence of gravity, when the ratchet mechanism is released and the brake chain unwound.

I have herein shown and described what I now consider the preferred manner of carrying out my invention, but the same is merely illustrative, and I contemplate all changes and modifications that come within the scope of the claims appended hereto.

I claim:

1. In a brake mechanism, the combination with a tightening element; of a plurality of transmitting means movable relatively to each other, said transmitting means being normally held in one position; clutch members associated with one of said transmitting means; and a driving element having a cam face, and a straight driving face, co-operating with said clutch members.

2. In a brake mechanism, the combination with a tightening element; of sets of transmitting means associated with said element, one set including a large gear and a small gear adjacent each other, and the other set including a small gear co-operating with said large gear and a larger gear connected to said smaller gear and spaced therefrom, said smaller gear having clutch members thereon; and a driving element having a cam face and a straight driving face, arranged to co-operate with said clutch members to drive and shift the sets of transmitting means.

3. In a brake mechanism, the combination with a tightening element; of a plurality of transmitting means movable relatively to each other to effect different ratios; a continuous shaft having means rigid therewith for driving said transmitting means in their normal position; means for automatically shifting said transmitting means relatively to each other to change the ratios dependent upon change of tension in the brake rigging; and means rigid with said shaft for driving said transmitting means in their shifted position.

4. In a brake mechanism, the combination with an operating element mounted for rotation and held against longitudinal movement; of a plurality of sets of transmitting means for effecting different ratios, one set of said transmitting means being capable of longitudinal shifting along said operating element and relatively to the other transmitting means, the latter being mounted for rotation in a predetermined position; means dependent upon the degree of tension in the brake rigging for automatically effecting shifting of the first transmitting means along said operating element relatively to the other transmitting means; and means for driving said first transmitting means in its various positions.

5. In a brake mechanism, the combination with a tightening element; of means including a shiftable driven member for transmitting power to said tightening element at a low power ratio to take up the slack in the brake mechanism in one operating position of said member and for transmitting power to said tightening element at a high power ratio to effect tightening of the brakes in another operating position of said member; hand operated driving means for said driven member comprising means including abutment members having inclined engaging faces for operatively connecting said driving means and driven member when the latter is in position to transmit power at a low ratio and automatically shifting said driven member to said second named operative position to transmit power to said tightening element at a high power ratio; and means for positively interlocking and rigidly connecting said driving means and driven element during operation thereof in a direction to tighten the brakes while operative at said high power ratio.

In witness that I claim the foregoing I have hereunto subscribed my name this 27 day of August, 1924.

JOHN F. O'CONNOR